United States Patent
Mosleh (10) Patent No.: US 9,434,905 B2
(45) Date of Patent: Sep. 6, 2016

(54) HYBRID NANOLUBRICANT

(75) Inventor: Mohsen Mosleh, Bethesda, MD (US)

(73) Assignee: Howard University, Washington, DC (US)

( * ) Notice: Subject to any disclaimer, the term of this patent is extended or adjusted under 35 U.S.C. 154(b) by 387 days.

(21) Appl. No.: 14/356,703

(22) PCT Filed: May 25, 2012

(86) PCT No.: PCT/US2012/039621
§ 371 (c)(1),
(2), (4) Date: Aug. 27, 2014

(87) PCT Pub. No.: WO2012/166615
PCT Pub. Date: Dec. 6, 2012

(65) Prior Publication Data
US 2014/0371119 A1    Dec. 18, 2014

Related U.S. Application Data (60) Provisional application No. 61/490,996, filed on May 27, 2011.

(51) Int. Cl.
*C10M 125/02*    (2006.01)
*C10M 125/22*    (2006.01)
(Continued)

(52) U.S. Cl.
CPC .............. *C10M 125/22* (2013.01); *B82Y 30/00* (2013.01); *C10M 171/00* (2013.01);
(Continued)

(58) Field of Classification Search
CPC ............ C10M 125/02; C10M 125/22; C10M 171/00; C10M 2201/041; C10M 2201/05; C10M 2201/061; C10M 2201/065; C10M 2201/066; C10M 2201/087; C10N 2210/06222; C10N 2210/02; C10N 2210/033; C10N 2210/082; C10N 2210/084; C10N 2230/06; C10N 2230/08; C10N 2240/10; C10N 2250/10; C10N 2250/12; C10N 2250/18; C10N 2270/00; B82Y 30/00
USPC ......................................... 508/129, 167, 155
See application file for complete search history.

(56) References Cited

U.S. PATENT DOCUMENTS 6,245,725 B1    6/2001    Tanaka et al.
8,038,751 B2    10/2011   Starling
(Continued)

FOREIGN PATENT DOCUMENTS

JP    2004-076003 A    3/2004
JP    2006-045350 A    2/2006
(Continued)

OTHER PUBLICATIONS

PCT International Search Report and Written Opinion of the International Searching Authority dated Aug. 31, 2012 for International Application No. PCT/US2012/039621, 11 pages.
(Continued)

*Primary Examiner* — James Goloboy
(74) *Attorney, Agent, or Firm* — Fitch, Even, Tabin & Flannery, LLP (57) ABSTRACT

A nanolubricant composition is described where the lubricant composition includes a flowable oil or grease with a multi-component nanoparticle dispersed in the flowable oil or grease. The multi-component nanoparticle includes a first nanoparticle component which effects thermal conductivity at a part interface and a second nanoparticle component which effects shearing at a part interface.

12 Claims, 4 Drawing Sheets

(51) Int. Cl.
*C10M 125/26* (2006.01)
*C10M 171/00* (2006.01)
*C10M 171/06* (2006.01)
*B82Y 30/00* (2011.01)

(52) U.S. Cl.
CPC ........ *C10M 171/06* (2013.01); *C10M 125/02* (2013.01); *C10M 2201/041* (2013.01); *C10M 2201/05* (2013.01); *C10M 2201/061* (2013.01); *C10M 2201/065* (2013.01); *C10M 2201/066* (2013.01); *C10M 2201/087* (2013.01); *C10N 2220/022* (2013.01); *C10N 2220/033* (2013.01); *C10N 2220/082* (2013.01); *C10N 2220/084* (2013.01); *C10N 2230/06* (2013.01); *C10N 2230/08* (2013.01); *C10N 2240/10* (2013.01); *C10N 2250/10* (2013.01); *C10N 2250/12* (2013.01); *C10N 2250/18* (2013.01); *C10N 2270/00* (2013.01)

(56) References Cited

U.S. PATENT DOCUMENTS

| | | | |
|---|---|---|---|
| 8,445,415 | B2 | 5/2013 | Mabuchi et al. |
| 8,598,098 | B2 | 12/2013 | Nakagawa et al. |
| 2007/0158609 | A1 | 7/2007 | Hong et al. |
| 2008/0081541 | A1 | 4/2008 | Kozasa et al. |
| 2008/0172951 | A1 | 7/2008 | Starling |
| 2008/0194377 | A1 | 8/2008 | Mordukhovich et al. |
| 2008/0234149 | A1* | 9/2008 | Malshe ................ C10M 141/10 508/150 |
| 2008/0242566 | A1* | 10/2008 | Lockwood ............ B82Y 30/00 508/113 |
| 2008/0248979 | A1 | 10/2008 | Nakagawa et al. |
| 2008/0269086 | A1 | 10/2008 | Adhvaryu |
| 2008/0312111 | A1* | 12/2008 | Malshe ................ C10M 171/06 508/155 |
| 2009/0042751 | A1 | 2/2009 | Narayan |
| 2009/0152050 | A1 | 6/2009 | Hattori et al. |
| 2010/0004147 | A1 | 1/2010 | Mizrahi |
| 2010/0029182 | A1 | 2/2010 | Fukuda et al. |
| 2010/0050872 | A1 | 3/2010 | Lee |
| 2010/0187925 | A1 | 7/2010 | Tingler et al. |
| 2011/0003721 | A1 | 1/2011 | Hong et al. |

FOREIGN PATENT DOCUMENTS

| | | |
|---|---|---|
| JP | 2006-241277 A | 9/2006 |
| JP | 2008-179738 A | 8/2008 |
| JP | 2009-523863 A | 6/2009 |
| JP | 2010-053236 A | 3/2010 |
| JP | 2010-516487 A | 5/2010 |
| JP | 2013-538274 A | 10/2013 |
| WO | 2007/082299 A2 | 7/2007 |
| WO | 2010/083041 A1 | 7/2010 |
| WO | 2012/029191 A1 | 3/2012 |

OTHER PUBLICATIONS

PCT International Preliminary Report on Patentability of the International Searching Authority dated Dec. 12, 2013 for International Application No. PCT/US2012/039621, 6 pages.
PCT International Search Report and Written Opinion of the International Searching Authority dated Sep. 4, 2012 for International Application No. PCT/US2012/039593, 13 pages.
PCT International Preliminary Report on Patentability of the International Searching Authority dated Apr. 3, 2014 for International Application No. PCT/US2012/039593, 7 pages.
European Patent Office Extended European Search Report dated Oct. 22, 2014 for European Patent Application No. EP 12 79 3537.7, 7 pages.
European Patent Office Extended European Search Report dated May 7, 2015 for European Patent Application Number EP 12 793 362.0, 9 pages.
J. L Viesca et al., Antiwear properties of carbon-coated copper nanoparticles used as an additive to a polyalphaolefin, Tribology International, Feb. 7, 2011, vol. 44, No. 7, pp. 829-831.

* cited by examiner

HYBRID NANOLUBRICANT

CROSS-REFERENCE TO RELATED APPLICATION

This application is a U.S. national phase application filed under 35 U.S.C. §371 of International Application PCT/US2012/039621, filed 25 May 2012, designating the United States, which claims benefit of U.S. Provisional Patent Application No. 61/490,996, filed May 27, 2011, which are hereby incorporated herein by reference in their entirety.

FIELD OF THE INVENTION

The present application generally relates to nanolubricants, and more specifically to nanolubricants containing hybrid nanoparticles composed of multiple nanoparticle components, such as a friction and wear modifying component and a thermal conductivity modifying component.

BACKGROUND OF THE INVENTION

The concept of nanofluids, i.e., nanoparticle-fluid dispersions, was introduced in the mid 1950's at the Argonne National Laboratory. Compared with millimeter- or micrometer-sized particle suspensions, nanofluids generally possess improved long term stability, much higher surface area, as well as improved mechanical, thermal and rheological properties. However, recent research efforts on nanofluids have mainly been focused on the preparation and evaluation of water or ethylene glycol (EG)-based nanofluids while reports of the synthesis of oil-based nanofluids are relatively uncommon.

Many nanofluids offer the potential for significant improvements in two distinct properties of interest to this proposal, namely tribological (friction and wear) and thermal properties. For example, regarding tribological properties, in the late 1960's, mineral oils with dispersed molybdenum disulfide ($MoS_2$) particles with an average size of 0.4 μm were tested and improved load carrying capacity and lower wear rate were reported. The improved tribological properties were attributed to strongly adhering and reformable deposits of flakes of the solid lubricant $MoS_2$ which provided a low shearing localized film between rubbing surfaces.

In recent studies, marked improvements in tribological properties of oils with dispersed inorganic fullerene-like (IF) 150-260 nm molybdenum disulfide ($MoS_2$) and 100-120 nm tungsten disulfide ($WS_2$) nanoparticles have been reported. The improvement was attributed to chemical stability of IF nanoparticles that resulted in reduced oxidation. The anti-wear and low friction behavior of a variety of nanoparticle dispersions including metallic oxides such as copper, zinc, zirconium, and titanium oxides and borates including titanium, lanthanum, zinc and ferrous borates and sulfides such as molybdenum and tungsten sulfides when dispersed in lubricants have also been reported. Nanoparticle characteristics such as size, shape, and concentration are shown to influence the tribological properties.

There have been several mechanisms contemplated in the literature by which dispersed nanoparticles in lubricants result in lower friction and wear. These mechanisms include: formation of a transferred solid lubricant film from nanoparticles under the contact pressure, rolling of spherical nanoparticles in the contact zone, reducing asperity contact by filling the valleys of contacting surfaces, and shearing of nanoparticles at the interface without the formation of an adhered film.

A new mechanism for the role of solid lubricant nanoparticles was recently proposed. According to the proposed mechanism, one role of solid lubricant nanoparticles in oils and greases is to break apart the wear agglomerate that is commonly formed at the sliding interface. The wear agglomerate, sometimes referred to as the transferred film, is normally adhered to the harder surface. The entrapment of the wear agglomerate reduces the contact area which in turn causes the normal contact pressure to be increased. Therefore, the plowing of the mating surface by the wear agglomerate is enhanced. The enhanced plowing increases friction and wear. The wear debris agglomeration process and some factors that affect it are discussed in the literature.

One of the reasons for the significant attention to nanofluids has been due to their enhanced thermal characteristics. From heat transfer theories, for a constant Nusselt number, the convective heat transfer coefficient is directly proportional to the thermal conductivity. With this observation, many researchers have focused on the thermal conductivity of nanofluids.

Some nanoparticles are known to be very thermal conductive. It has been shown that the dispersion of nanoparticles in fluids can improve the suspension's effective thermal conductivity. For instance, some experimental studies revealed that even for a very small percentage of 0.1-0.5 of metallic or oxide nanoparticles, the effective thermal conductivity of the dispersion can be increased by as much as 5-60%. Also, the effective thermal conductivity of ethylene glycol (EG) is increased by up to 40% when a 0.3 volumetric percent of copper nanoparticles of mean diameter less than 10 nm are dispersed in it. Use of dispersions of thermally conductive nanoparticle in combination with lubricating nanoparticles has heretofore been unknown to provide superior lubrication with superior heat dissipation to provide lubricants which not only have superior lubrication properties, but also mitigate or eliminate hot sports which can cause excessive part wear.

U.S. Publication No. 2011/0003721 to Hong et al. describes a nanofluid which comprises a thermal transfer fluid and carbon nanoparticle tubes as a part of lubricating compositions. Hong et al. describe a nanogrease using carbon nanotubes as a solid heat transfer medium to enhance thermal conductivity and high temperature resistance. However, Hong et al. fail to address hybrid integrated nanoparticles, such as formed from multiple nanoparticle components, which effect multiple functionalities of lubrication and heat dissipation.

SUMMARY OF THE INVENTION

A nanolubricant composition is described where the lubricant composition includes a flowable oil or grease with a multi-component nanoparticle dispersed in the flowable oil or grease. The multi-component nanoparticle includes a first nanoparticle component which effects thermal conductivity at a part interface and a second nanoparticle component which effects shearing at a part interface. In an important aspect, the second nanoparticle component is at least partially integrated with the first nanoparticle component. The first nanoparticle component enhances thermal conductivity of the nanolubricant composition to a greater extent than the second nanoparticle component.

The first nanoparticle can enhance the thermal conductivity to a greater extent than the second nanoparticle component, but the second nanoparticle component can also enhance thermal conductivity to a greater extent than the first particle. In an important aspect the first nanoparticle component is a core of the integrated multi-component particle and the second nanoparticle component at least partially coats the first nanoparticle component or completely coats the first nanoparticle component. In another aspect, the second nanoparticle component is at least partially embedded or fully embedded into the first nanoparticle component. In another aspect, the first nanoparticle component is selected from the group consisting of diamond nanoparticles, carbon nanotubes, silver, copper, aluminum nitride, and mixtures thereof, and the second nanoparticle component has a laminar structure. Generally the first nanoparticle component has an average particle size in the range of from about 1 nm to about 25 nm.

Further, in yet another important aspect, the first nanoparticle component which effects the thermal conductivity of the nanolubricant composition generally has an average particle size in the range of from about 1 nm to about 25 nm and comprises from about 0.1 to about 5 weight percent of the nanolubricant composition and the nanoparticle which effects shearing is selected from the group consisting of molybdenum disulfide, tungsten disulfide, hexagonal boron nitride and graphite, and has an average particle size of from about 10 to 100 nm, and comprises from about 0.1 to about 5 weight percent of the lubricant composition.

Further, in the nanolubricant composition, the spherical nanoparticle component which affects shearing has a diameter of less than about 0.7 times the mean roughness of a contacting surface. If the second nanoparticle component is not generally round, its length is less than about 4 times the mean roughness of the contacting surface.

Also described herein is a method of simultaneously modifying the heat transfer characteristics and the lubrication characteristics of a lubricating oil or grease by mixing the unitary nanoparticles described above with an oil or grease.

Further, a method of making the unitary nanoparticles also is described herein.

In one example, nanolubricants/fluids that simultaneously exhibits improved tribological properties and enhanced thermal conductivity compared to the lubricants that are currently used in the internal combustion engines and transmissions. The approach is to introduce a hybrid system consisting of base oil, a friction and wear modifier (FWM) nanoparticle, and a thermal conductivity modifier (TCM) nanoparticle for obtaining the desired nanolubricant properties.

DETAILED DESCRIPTION

Hybrid nanolubricants, such as those containing multiple nanoparticle components of different materials and properties, may be created to provide a single multi-component nanoparticle for use in a variety of products. For example, one such product would use one or more different forms of hybrid nanoparticles in a nanolubricant to improve tribological properties and enhance thermal conductivity compared to the lubricants that are currently used in the internal combustion engines and transmissions. Further, such an approach may produce nanolubricant that may improve the life of cutting tools due to reduction of cutting forces, reduction of tool wear and faster heat transfer away from the cutting surfaces.

As noted above, hybrid nanoparticles may contain two or more different nanoparticle components. In other words, two or more different types, forms, compositions, etc. of nanoparticle components may be included in a hybrid nanoparticle. The multiple components may be integrated into combined hybrid nanoparticle such that at least a portion of one of the nanoparticle components is chemically bonded to or otherwise intertwined with a second nanoparticle component. For example, one of the nanoparticle components may at least partially coat or completely coat another nanoparticle component. In another example, one of the nanoparticle components may be otherwise chemically bonded with or intertwined with another nanoparticle component.

Depending on the different types, forms, compositions, etc. of nanoparticle components used in the hybrid nanoparticle, the hybrid nanoparticle may be considered to be functionalized such that the hybrid nanoparticle may have functional features from each of the nanoparticle components. For example, the hybrid nanoparticle may be composed of a friction and wear modifying component and a thermal conductivity modifying component such that the hybrid nanoparticle includes each of these functionalities. Other functionalities and nanoparticle components are also contemplated, including, but not limited to, shelf-life without sedimentation, color, and cost of the resultant nanolubricant.

The hybrid nanoparticle may include any number of different types, forms, compositions, etc. of nanoparticle components as desired to provide various specialized functionalities which may be incorporated into other products. For example, in one form, a nanolubricant may be created using a base oil, such as engine oil or a transmission oil, which further includes hybrid nanoparticles. In one form, the hybrid nanoparticles may include two or more different nanoparticle components, including, but not limited to, a friction and wear modifier (FWM) component and a thermal conductivity modifier (TCM) component.

In one form, the FWM component may be a solid lubricant with a lamellar molecular structure that provides easy shearing at the asperity contact level. For example, the FWM component may be molybdenum disulfide ($MoS_2$), tungsten disulfide ($WS_2$), hexagonal boron nitride (hBN), graphite, or other materials with a lamellar structure whose superior solid lubrication properties, especially at high temperature, are well established.

Figure 1:
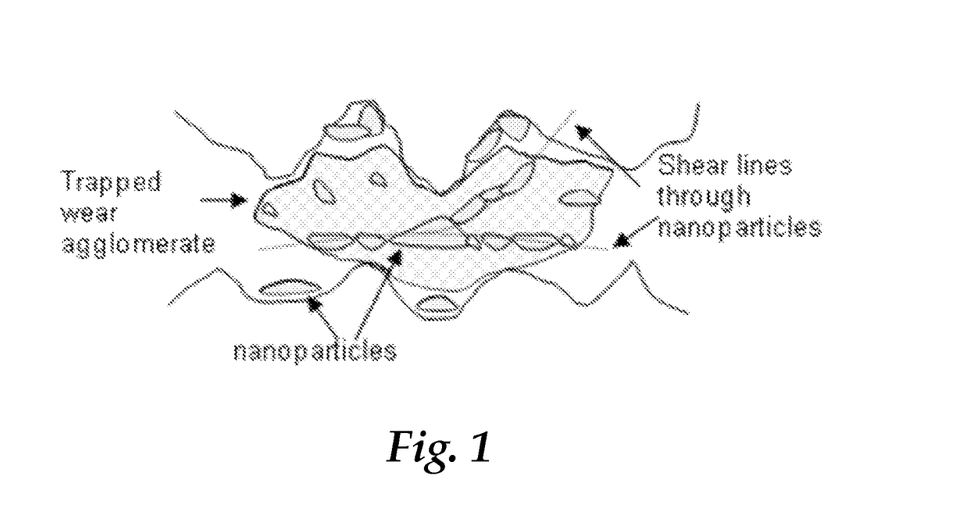
FIG. 1 is a representation of one proposed mechanism whereby solid lubricant particles penetrate a wear agglomerate to cause breakage of the wear agglomerate.

Solid lubricant nanoparticles which are dispersed in the lubricant penetrate between layers of the wear agglomerate and form weak shear planes. Therefore, the agglomerate breaks easier and therefore plows less, reducing friction and wear. The mechanism is schematically depicted in FIG. 1. It is noteworthy that based on this mechanism the shape of the nanoparticles do not play a significant role on the tribological properties of the nanolubricant because their shearing is what makes them effective. Such a mechanism may provide beneficial functionality when combined with a further nanoparticle component in a hybrid nanoparticle.

The concentration of the FWM component in the hybrid nanoparticle may be varied as desired. For example, in one form, the concentration of the FWM component is 0.1-5% by weight to minimize the cost while providing significant wear improvement. However, the concentration may be increased as desired.

Figure 2:
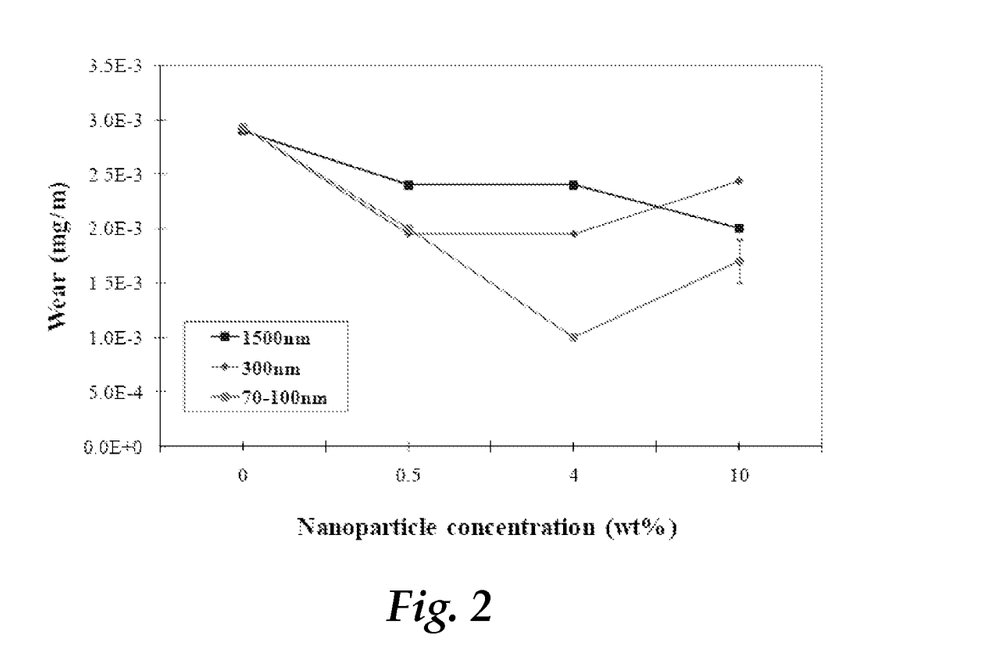
FIG. 2 is a graph representing the wear of steel surfaces using a nanolubricant having $Mo_2S$ nanoparticles at different concentrations.

Wear data is presented in FIG. 2 for various concentrations of molybdenum disulfide in a nanolubricant. A marked reduction in wear of steel/steel pairs was observed when modified sheet metal working fluids with nanoparticles were used. Using a pin-on-disc tribometer, 440C steel balls were rubbed against steel discs (AMS 5518) under a contact stress of 1 GPa. The largest wear reduction was at 4% particle concentration and particle average size of 70-100 nm. However, the nanolubricant with 0.5% particle concentration also showed 33% reduction in wear.

It should be noted that while the primary goal of using a FWM nanoparticle component is to reduce friction and wear, the FWN may also increase the thermal conductivity of the nanolubricant because of their higher thermal conductivity compared with that of the base oil.

In one form, the TCM component may be chosen from materials with a thermal conductivity several order of magnitudes higher than that of the base oil. For example, such TCM components may include, but are not limited to, diamond nanoparticles and carbon nanotubes. Other nanoparticles may also be selected as the TCM component to provide improved thermal conductivity functionality.

The sizes of the respective nanoparticle components may also be varied as desired. In certain forms, the size of hybrid nanoparticles and/or the individual nanoparticle components plays an important role in the functionality of the hybrid nanoparticles.

Generally, FWM nanoparticles with an average size of 10-100 nanometers may be used and is generally determined by the roughness of the surfaces to be contacted. The aspect ratio of the FWM nanoparticles is one for spherical and as high as 1000 for flake-like particles.

As for the thermal conductivity component, it is usually understood that thermal conductivity is higher for smaller size nanoparticles. This behavior is intuitively correct as the thermal energy transfer is dependent on surface area and smaller particles of same volumetric concentration provide more surface area for the transfer of thermal energy. This assertion is confirmed by the correlation from the experimental data reported in the literature, which shows that the thermal conductivity of nanofluids is inversely proportional to the nanoparticle diameter.

Generally nanoparticle size for TCM nanoparticles is chosen to be much smaller than the size of FWM nanoparticles. For example, diamond nanoparticles having a diameter of 3-5 nm may be used while carbon nanotubes having a 5-25 nm diameter and 50-1000 nm length may be used. It is generally desired to have the TCM nanoparticles smaller than the FWM nanoparticles in the nanolubricant for two reasons. First, in case of minor settlement of FWM nanoparticles on the rubbing surface, they are still effective in providing easy shearing at the asperity level and lowering friction and wear. That is not the case for TCM nanoparticles as their settlement immediately reduces the thermal conductivity of the nanolubricant. Second, with respect to the thermal conductivity, the smaller the nanoparticle, the more enhancements in the thermal conductivity of the nanolubricant can be achieved due to their increased surface area. However, that is not the case for the FWM nanoparticles as the effectiveness of solid lubricant nanoparticles when their size is less than few nanometers is significantly reduced. The aspect ratio of the TCM nanoparticles is one for spherical and as high as 100 for flake-like particles.

The hybrid nanoparticles may be manufactured in a number of different manners. For example, the nanoparticle components may be combined in such processes including, but not limited to, mechanical ball milling, arc discharge in liquid, oxidation-reduction reactions in solution, chemical vapor deposition and the like. The methods may be modified as necessary to accommodate the different nanoparticle components and properties.

Figure 3:
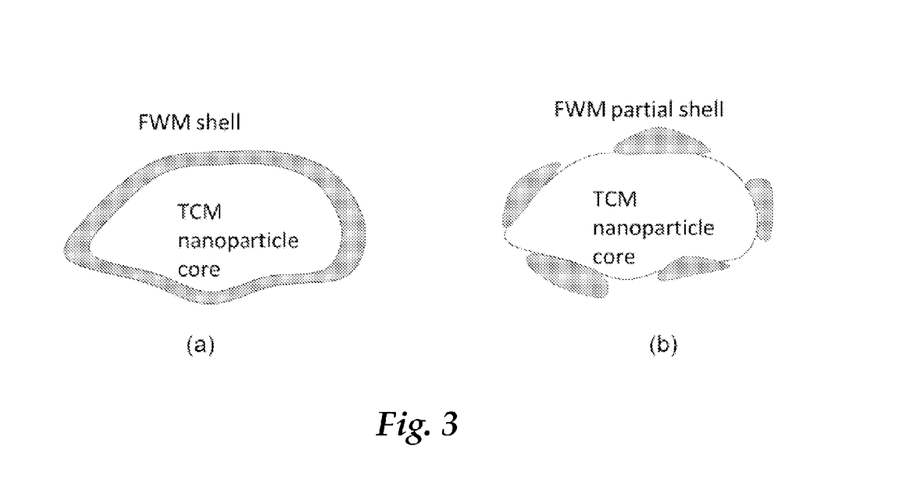
FIG. 3(a) is a representation of one form of a hybrid nanoparticle.
FIG. 3(b) is a representation of another form of a hybrid nanoparticles.

As noted above, the resulting hybrid nanoparticle may include an integration of a first nanoparticle component with a second nanoparticle component. Such integration may include intertwining, coating, partial coating and the like. Exemplary hybrid nanoparticles are illustrated in FIGS. 3(a) and 3(b), each including a FWM component and a TCM component. As illustrated in FIG. 3(a), the FWM component forms a shell, completely coating the TCM component as a core. In FIG. 3(b) the FWM component forms a partial shell on the TCM component. It should be understood that the FWM and TCM components may be revered such that the TCM component forms a shell or partial shell on the FWM component.

The hybrid nanoparticles may be used in a variety of types of lubricants. In this regard, the lubricant or base oil may include a variety of well-known base oils. For example, the lubricant oil may include organic oils, petroleum distillates, synthetic petroleum distillates, vegetable oils, greases, gels, oil-soluble polymers and combinations thereof. The lubricant may have a wide variety of viscosities. For example, if the lubricant is an oil, the viscosity may be in the range of about 10 to 300 centistokes. In another form, the lubricant is a grease having a viscosity of about 200 to 500 centistokes.

The nanolubricant may also include other components as desired. For example, in addition to the lubricant component and the hybrid nanoparticles, the nanolubricant may also include surfactants. In one form, prior to dispersion in oil, surfaces of all hybrid nanoparticles will be coated with surfactants with proper head group size and tail length depending on the overall specifications of the nanofluid. Alternatively, surfactants may be added to the nanolubricant separately from the hybrid nanoparticles. The surfactants may include, but are not limited to, oleic acid, dialkyl dithiophsphate (DDP), Phosphoric acid, and Canola oil.

EXAMPLES

In Example 1, extreme pressure (EP) testing of a control base oil and an oil containing hybrid nanolubricants was performed. More specifically, Sample A was a hybrid nanolubricant which consisted of 10W30 base oil, 0.1% by weight diamond nanoparticles with an average particle size of 3-6 nm and 2% $MoS_2$ nanoparticles with an average particle size of 70-100 nm. The control was pure 10W30 base oil without any nanoparticles.

Figure 4:
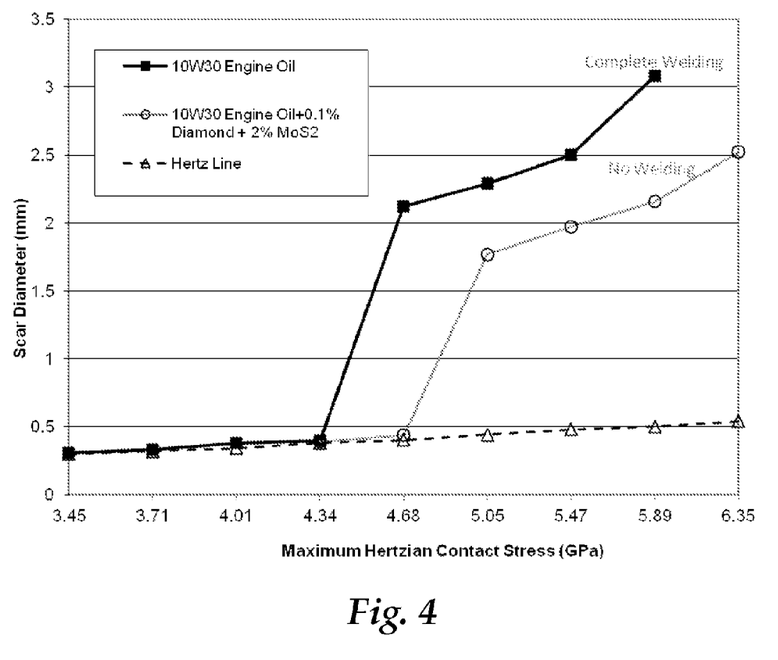
FIG. 4 is a graph illustrating contact stress versus scar diameter for a control lubricant and a lubricant including a nanolubricant.

The testing was conducted according to ASTM D2873 using a four-ball tester. The ball specimens were AISI 52100 steel with a surface roughness of 25 nm. Sample A, which included the hybrid nanolubricant, yielded significant tribological improvements compared with the pure 10W30 base oil control. For instance, as shown in FIG. 4, the use of hybrid nanolubricant resulted in much higher load carrying capacities and smaller wear scar diameters. In the plot, the Hertz line represents the diameter of the contact area based on the ideal elastic deformation of ball without any wear.

At a contact stress of 5.89 GPa, the seizure and complete welding of balls occurred when 10W30 base oil was the lubricant. Under this and higher contact stresses, the balls did not seize when the hybrid nanolubricant was used.

Figure 5:
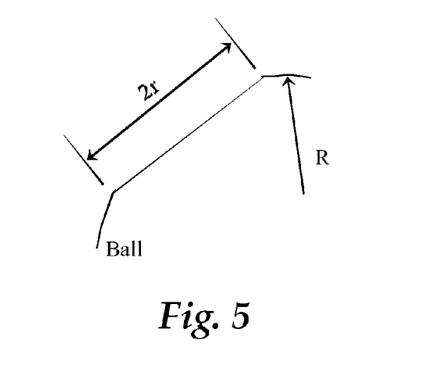
FIG. 5 is a representation showing measurements taken on a ball to determine wear volume.

These results were then used to compare wear volume and scar diameter for the respective lubricants. For a spherical ball with a radius of R as shown in FIG. 5, the volume of wear $V_{wear}$ is related to the wear scar diameter (2r) through the following relationship:

$$V_{wear} = \left(\frac{\pi}{3}\right)h^2(3R - h)$$

The reference h is defined by the following equation:

$$h = [R - \sqrt{R^2 - r^2}]$$

As the relationship is not linear, the percentage change in wear volume as a result of percentage change in wear scar diameter is shown in the table below for the value of Hertzian contact stresses Example 1.

TABLE 1

Scar diameter reduction and wear volume reduction for nanolubricant compositions.

| Hertzian Contact Stress (GPa) | % reduction in scar diameter (2r) with hybrid nanolubricant | % change in wear volume ($V_s$wear) with hybrid nanolubricant |
|---|---|---|
| 4.68 | 79.4 | 99.8 |
| 5.05 | 22.8 | 64.7 |
| 5.47 | 21.1 | 61.4 |
| 5.89 | 30.1 | 76.3 |

It should be noted from the results of Example 1 that the inclusion of diamond nanoparticles does not impair the wear performance of the lubricant composition.

In Example 2, the thermal conductivity of hybrid nanoparticles was compared to a control. More specifically, Sample B was a hybrid nanolubricant which consisted of 10W30 base oil, with varying amounts of diamond nanoparticles with an average particle size of 3-6 nm and 2% $MoS_2$ nanoparticles with an average particle size of 70-100 nm. The control was pure 10W30 base oil without any $MoS_2$ nanoparticles, but with varying amounts of diamond nanoparticles with an average particle size of 3-6 nm.

A hot disk measurement technique was used to compare the compositions in a 25° C. environment. In the test, a Hot Disk Thermal Constant Analyzer system was used to measure the transport properties of the samples (i.e. thermal conductivity and thermal diffusivity). This method is based on a procedure by which a string of square pulses, via an AC-coupled circuit, is applied to the hot strip, which is acting both as a heat source and a sensor of the temperature increase of the substrate. The details of this technique for measuring thermal conductivity and diffusivity of solids and fluids can be found in: (1) M. Gustavsson, N. S. Saxena, E. Karawacki, and S. E. Gustafsson: Specific Heat Measurements with the Hot Disk Thermal Constants Analyser, Thermal Conductivity 23, 56-65 (1996); (2) S. E. Gustafsson, "Transient hot strip techniques for measuring thermal conductivity and thermal diffusivity," The Rigaku Journal, Vol. 4, No. 1, 2, 1987; and (3) M. Gustavsson, J. Gustavsson, S. Gustafsson, L. Halldahl, "Recent developments and applications of the hot disk thermal constants analyser for measuring thermal transport properties of solids," High Temperatures—High Pressures, Vol. 32, No. 1, pp. 47-51, 2008. The test utilized TPS-500 Transient Plane Source Thermal Constants Analyzer manufactured by ThermTest (http://www.thermtest.com/). The applied power was 0.15 Watt and the test time was 5 seconds. A volume of 2 milliliters of the fluid was used as the test specimen in the test chamber.

Figure 6:
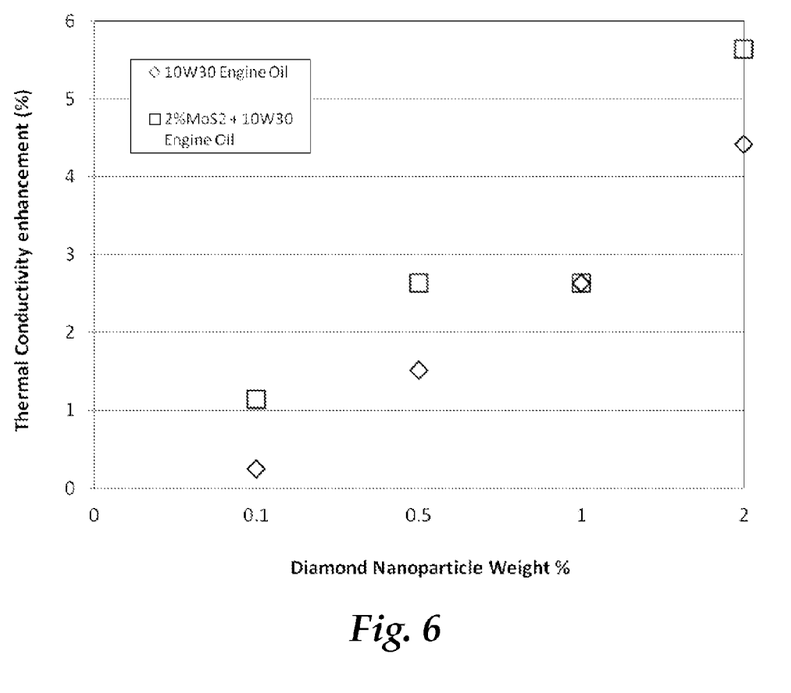
FIG. 6 is a graph illustrating thermal conductivity enhancement as increasing amounts of diamond nanoparticles are introduced into a lubricant.

As shown in FIG. 6, as the percentage of diamond nanoparticles increases, the thermal conductivity of the hybrid nanolubricant linearly increases. Also, the existence of $MoS_2$ nanoparticles in the hybrid nanolubricant causes enhanced thermal conductivity.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A nanolubricant composition comprising;
   a flowable lubricant; and
   a multi-component nanoparticle dispersed in the lubricant, the multi-component nanoparticle including a first nanoparticle component which effects thermal conductivity at a part interface and a second nanoparticle component which effects shearing at a part interface, the second nanoparticle component at least partially integrated with the first nanoparticle component and the first nanoparticle component enhancing thermal conductivity of the nanolubricant to a greater extent than the second nanoparticle component, wherein the first nanoparticle component is selected from the group consisting of diamond nanoparticles, carbon nanotubes, and mixtures thereof, and the second nanoparticle component has a laminar structure.

2. The nanolubricant composition of claim 1 wherein the second nanoparticle component at least partially coats the first nanoparticle component.

3. The nanolubricant composition of claim 2 wherein the second nanoparticle component completely coats the first nanoparticle component.

4. The nanolubricant composition of claim 1 wherein the second nanoparticle component is at least partially embedded into the first nanoparticle component.

5. The nanolubricant composition of claim 1 wherein the first nanoparticle component has a diameter of from about 1 nm to about 25 nm.

6. A nanolubricant composition comprising;
   a lubricant; and
   a multi-component nanoparticle, the multi-component nanoparticle including a thermal conductivity modifying nanoparticle component and a friction modifying nanoparticle component at least partially integrated with the thermal conductivity modifying nanoparticle component, the thermal conductivity modifying nanoparticle component is selected from the group consisting of diamond nanoparticles, carbon nanotubes, and mixtures thereof and has an average particle size in the range of from about 1 nm to about 25 nm and comprises from about 0.1 to about 5 weight percent of the nanolubricant composition and the friction modifying nanoparticle component is selected from the group consisting of molybdenum disulfide, tungsten disulfide, hexagonal boron nitride, graphite and mixtures thereof, and has an average particle size of from about 10 to 100 nm and comprises from about 0.1 to about 5 weight percent of the nanolubricant composition, the friction modifying nanoparticle component having a laminar structure.

7. The nanolubricant composition of claim 6 wherein the friction modifying nanoparticle component at least partially coats the thermal conductivity modifying nanoparticle component.

8. The nanolubricant composition of claim 6 wherein the thermal conductivity modifying nanoparticle component at least partially coats the friction modifying nanoparticle component.

9. The nanolubricant composition of claim 6 wherein the friction modifying nanoparticle component is at least partially intertwined with the thermal conductivity modifying nanoparticle component.

10. The nanolubricant composition of claim 6 wherein the thermal conductivity modifying nanoparticle component has a diameter of less than about 25 nm.

11. A method of manufacturing a nanolubricant comprising the steps of:
   providing a lubricant oil;
   providing a multi-component nanoparticle, the multi-component nanoparticle including a first nanoparticle component and a second nanoparticle component at least partially integrated with the first nanoparticle component, wherein the first nanoparticle component is selected from the group consisting of diamond nanoparticles, carbon nanotubes, and mixtures thereof, and the second nanoparticle component has a laminar structure; and
   combining the multi-component nanoparticle with the lubricant oil.

12. The method of claim 11 further comprising the step of integrating the second nanoparticle component with the first nanoparticle component using a process selected from the group consisting of mechanical ball milling, arc discharge in liquid, oxidation-reduction and chemical vapor deposition.

* * * * *